United States Patent [19]

Hutcheon et al.

[11] Patent Number: 4,967,302
[45] Date of Patent: Oct. 30, 1990

[54] SAFETY BARRIERS FOR 2-WIRE TRANSMITTERS

[75] Inventors: Ian C. Hutcheon, Luton; David J. Epton, Dunstable, both of England

[73] Assignee: Measurement Technology Limited, Bedfordshire, England

[21] Appl. No.: 200,617

[22] Filed: May 31, 1988

[30] Foreign Application Priority Data

Jun. 2, 1987 [GB] United Kingdom ................ 8712865

[51] Int. Cl.$^5$ ............................................. H02H 3/20
[52] U.S. Cl. ........................................ 361/1; 361/54; 361/57; 361/58; 207/326; 207/327
[58] Field of Search ...................... 361/1, 2, 54, 56, 57, 361/58; 307/326, 327

[56] References Cited

U.S. PATENT DOCUMENTS

| | | | |
|---|---|---|---|
| 3,309,542 | 3/1967 | Elliot | 361/1 |
| 3,445,679 | 5/1969 | Mayer et al. | 361/1 |
| 3,818,273 | 6/1974 | Nakashima | |
| 3,976,170 | 8/1976 | Hogan | 361/58 X |
| 4,412,265 | 10/1983 | Buuck | 361/56 X |
| 4,542,302 | 9/1985 | Griffioen | 307/326 |

FOREIGN PATENT DOCUMENTS

| | | | |
|---|---|---|---|
| 1238198 | 7/1971 | United Kingdom | . |
| 1310354 | 3/1973 | United Kingdom | . |
| 2094572 | 9/1982 | United Kingdom | 361/1 |

Primary Examiner—Derek S. Jennings
Attorney, Agent, or Firm—Seidel, Gonda, Lavorgna & Monaco

[57] ABSTRACT

A single-channel shunt-diode safety barrier for energizing a 2-wire transmitter, particularly for use in process control, incorporates within the barrier a floating d.c. power supply or its equivalent to enable the barrier to deliver into an earthed load a direct current substantially equal to that which it draws from the transmitter. The floating d.c. power supply is preferably derived from an external d.c. power source via a transformer or diode-pump circuit within the barrier itself. The barrier is enabled to pass superimposed digital or frequency signals in both directions to and from the transmitter.

17 Claims, 5 Drawing Sheets

SAFETY BARRIERS FOR 2-WIRE TRANSMITTERS

FIELD OF THE INVENTION

This invention relates to safety barriers for 2-wire transmitters, particularly for use in process control and similar applications.

DESCRIPTION OF THE PRIOR ART

In process control and similar applications it is often required to energise a considerable number of 2-wire transmitters and their associated sensors from a single dc source of power which is positive with respect to earth. FIG. 1 shows one example of a typical known arrangement. Each transmitter acts as a variable resistor to control the current in the loop so that it represents the value of a measured variable, for example pressure, temperature, flow or level. Typically, the signal is in the internationally-recognised standard range of 4 to 20 mA, and is required to flow through a 250 ohm resistor connected to earth at the control room, and so generate a signal of 1/5V to operate indicating, recording or control equipment. Virtually all commercially available instrument systems require the voltage generated to be positive with respect to earth. (Throughout the specification and claims, the words "earth" and "ground" shall be synonymous.)

Typical instrument-system power supplies are nominally 24V, roughly regulated within 22 to 28V limits. Hence, the voltage available for the transmitter and lines and any series-connected equipment, such as an indicator, is at least 22 minus 5 equals 17V at the maximum current of 20 mA. Since most commercially available transmitters will work down to 12V (occasionally 10V), the voltage available in this arrangement is more than adequate. Any excess is dropped across the transmitter. A recent additional requirement for transmitter loops is that they should handle digital or frequency signals to and from a 'smart' transmitter. These signals are superimposed on the 4 to 20 mA dc by the transmitter itself, or by equipment in the receiving station, or by a hand-held device that connects across the two wires.

In oil, gas, petrochemical, chemical and other processes where flammable gases, liquids or dusts (grain silos) may be present, it is increasingly the practice to protect against the danger of explosion by the technique of intrinsic safety. Typically, a safety barrier is connected in series with each non-earthed line between the control room and the process, as shown in FIG. 2. In normal operation each barrier passes the desired signal without attenuation but, in the event of an electrical fault in the safe area, the barrier limits the voltage and current that can reach the process. This ensures that any sparks arising from further faults in the hazardous area are too small to cause ignition. In practice the two barriers may be packaged as a single '2-channel' unit.

Atmospheres are categorised according to their ease of ignition by a spark. A barrier that is safe for use with Group 'IIC' gases, e.g. hydrogen and acetylene, will have a higher resistance than one that is safe for 'IIB' or 'IIA' gases only, e.g. ethylene or propane. Unfortunately, the introduction of barriers increases the voltage drop around a transmitter loop, often to the point where there is little voltage to spare, and the design of the loop becomes marginal. In particular, the power supply may need to be closely regulated, with the consequent danger of blowing the fuses in many barriers at once if some malfunction permits even a momentary slight increase in voltage. For example, FIG. 2 shows the voltage drops at 20 mA in the two channels of a typical 2-channel barrier, designed for use with any atmosphere including Group 'IIC' gases. The combined voltage drop of the two channels at 20 mA is 8.5V. The maximum voltage that can be applied to the outgoing channel of this barrier without blowing the fuse is 26.0V. Even if the power supply is held at precisely this value, the voltage available for the transmitter and lines at 20 mA is only 26 minus (8.5+5) equals 12.5V. If the transmitter itself requires 12V to operate, as is typically the case, the arrangement leaves little margin (0.5V) for long transmission lines, imperfect regulation of the supply, voltage lost in common power cables or series-connected equipment, and so on.

Various attempts have been made to devise satisfactory passive safety barriers in order to overcome these difficulties.

One well-known and quite widely used solution is to convert the return current into a voltage signal (typically 1/5V) on the hazardous-area side of the barrier. Bringing back a voltage eliminates the voltage drop in the return channel caused by bringing back a current. One version of the barrier depicted in FIG. 2 contains a precision 250 ohm resistor for the purpose. The reduction in voltage drop is 1.7V, making 14.2V available for the transmitter and lines if the supply is closely regulated. This arrangement is not always satisfactory, however, because the voltage signal is generated with respect to the earthed busbar on which the barriers are mounted. The potential of the busbar, in practice, may differ from that of the OV rail of the receiving equipment, due for example to voltage drops in common cables. A defined-current signal is often preferable, since it will generate a voltage with respect to any earth point in a system, thereby reducing the practical problems of wiring-layout design and earthing. This is a serious consideration, particularly in large instrumentation schemes.

Another proposed passive barrier solution is to use a barrier that is designed for use with IIB and IIA gases only. Since these gases tolerate larger sparks, the resistance of the barrier can be about half that required for IIC applications. If the barrier depicted in FIG. 2 were redesigned for IIB gases, its resistance would fall by about 150 ohms, saving 3V at 20 mA. However, this approach suffers from the obvious disadvantage that it cannot be used with IIC gases. Although hydrogen or acetylene often are not present, users like to have a simple, universal solution that minimises their decisions.

A further possible solution might be to reduce the output voltage, on the basis that the requirement for a 1/5V signal could be relaxed in the light of the ability of modern semi-conductor circuits to handle smaller signals accurately, e.g. 0.2 to 1.0V. This is true in principle, and may occasionally be done, but in practice the overriding consideration is that 1/5V has become an accepted standard in most parts of the world, for which most receiving equipment is designed.

Because of the lack of an ideal solution using purely passive barriers, efforts have been made to generate designs incorporating additional active components, such as transistors, to provide enhanced performance.

Active barriers are known in which the vital 'terminating resistor' is replaced by a current-limiting circuit using 2 or 3 transistors. This can reduce the voltage drop for a given maximum current. However, certifying authorities will give such barriers only an 'ib' reliability rating, for use with apparatus in zones 1 & 2, because of the possibility that they may pass brief transients which may cause ignition, whereas much of the market looks for an 'ia' rating even though the zone 0 applications, for which they can be used, are relatively infrequent. Present 'ia' solution rely on driving the load directly on the safe-area side of the barrier, rather than from a current returned from the hazardous area via a second barrier channel. The outgoing channel then has to supply only the transmitter and its lines. It no longer has to support the additional voltage required by the load and a second channel. Since any leakage across the outgoing channel would now give rise to errors, these solutions normally incorporate some form of regulating circuit to ensure that the voltage applied to the channel is held automatically below the level at which the Zener diodes start to conduct significantly. This is no problem, but of course the current drawn by any monitoring (comparator) amplifier connected directly to the barrier must be made negligible in relation to 20 mA. For example it must not exceed a few microamp.

One active 'ia' barrier system of this type is known as the current-mirror arrangement. In this approach, as shown in FIG. 3, a second 'parallel' current I2 is generated from the common power supply to drive the safe-area load. It is made equal to the transmitter current I1 by the action of the two nominally-equal resistors R1 and R2 and the high-gain, low-drift, dc comparator amplifier A1. The circuit also includes voltage amplifiers J1 and J2. The barrier is positively polarised. A second comparator amplifier A2 maintains the voltage across the input to the barrier at a level (Vref) somewhat below that at which the Zener diodes in the barrier would start to conduct, whatever the transmitter current or the supply voltage. The current drawn by this amplifier must be negligible in comparison with 20 mA, e.g. a few microamp. To prevent the fuse from blowing and the power supply from become overloaded in the event of a short-circuit between the hazardous-area lines, a current-limiting circuit, FIG. 4, may be included. If the current significantly exceeds 20 mA, this circuit overrides the control signal to voltage amplifier J1 and acts to turn amplifier J1 OFF. Though solving most applicational problems very satisfactorily the current-mirror arrangement has some disadvantages:

(a) The accuracy with which the transmitter current is repeated, though high, inevitably is not perfect.
(b) The current consumed at full output cannot be less than 40 mA, and in practice is up to 60 mA at 35V, due to the 'overhead' requirements of the two amplifiers and the reference voltage.
(c) The barrier will receive digital or frequency signals from a 'smart' transmitter but cannot transmit them in the other direction, i.e. it is inherently not bi-directional.
(d) To achieve an output of say 14V from a 22V supply the barrier in practice has a non-standard 'safety description' (maximum output voltage and minimum terminating resistor).
(e) The cost is quite high (about twice that of a 1-channel passive barrier) due to the need for two operational amplifiers and a calibration procedure to adjust for small differences between R1 and R2, and amplifier offsets during manufacture.

SUMMARY OF THE INVENTION

It is an object of the present invention to provide an improved safety barrier which overcomes or minimises the aforementioned disadvantages of the prior art.

The safety barrier of the present invention is based upon the concept of using a floating power supply or its equivalent.

Broadly in accordance with the invention there is provided a safety barrier for energizing a 2-wire transmitter, the barrier incorporating a floating dc power supply or the equivalent to enable the barrier to deliver into an earthed load a direct current substantially equal to that which it draws from the transmitter.

Preferably, the floating dc power supply is derived from an external dc source of power, with means to generate the floating power supply being located within the barrier.

Said means may comprise an oscillator, a transformer and a rectifying and smoothing circuit, all within the barrier.

The transformer is preferably a voltage-step-up transformer.

Alternatively, the oscillator may drive one or more diode-pump circuits to perform the same function without the need for a transformer.

In certain embodiments one or more switched inductors may be provided to boost the voltage available. The on-time of the switch or switches can be used to provide the desired voltage boost. The on-time may be 0.25 of a cycle for example. The switched inductor may directly provide the ac drive for the diode pump.

In one preferred embodiment the barrier is polarised to pass signals of negative polarity with respect to earth and the current delivered to the load is positive with respect to earth.

The voltage applied to the barrier is preferably held automatically somewhat below the level at which the barrier would start to conduct, by means of a regulating circuit or circuits, which compensate for variations in the supply voltage and the voltage drop across the load. The regulating circuit may be a switching regulator. Compensation for variations in the voltage across the load is preferably delayed in time so that the barrier will pass superimposed digital or frequency signals in both directions to and from a 'smart' transmitter.

Desirably, the current drawn from the external supply is limited automatically to a level that will not blow the fuse in the barrier or overload the power supply.

The safety barrier of the present invention includes the following advantages:

(a) Extremely high accuracy, since the transmitter and load currents are one and the same thing.
(b) Lower current consumption, typically in the region of 40mA, since there is only the one current, and excessive output power is not provided.
(c) Ability not only to receive digital or frequency signals from a smart transmitter, but also to pass them in the other direction.
(d) Standard safety description of (eg) 28V,300 ohms.
(e) Lower cost than the current-mirror solution, since it needs not more than one comparator amplifier (whose voltage drift is not critical) and no calibration during manufacture.

BRIEF DESCRIPTION OF THE DRAWINGS

The invention will now be described in more detail, with reference to a number of preferred embodiments, and with reference to the drawings. In the drawings.

DESCRIPTION OF THE PREFERRED EMBODIMENTS

Figure 1:
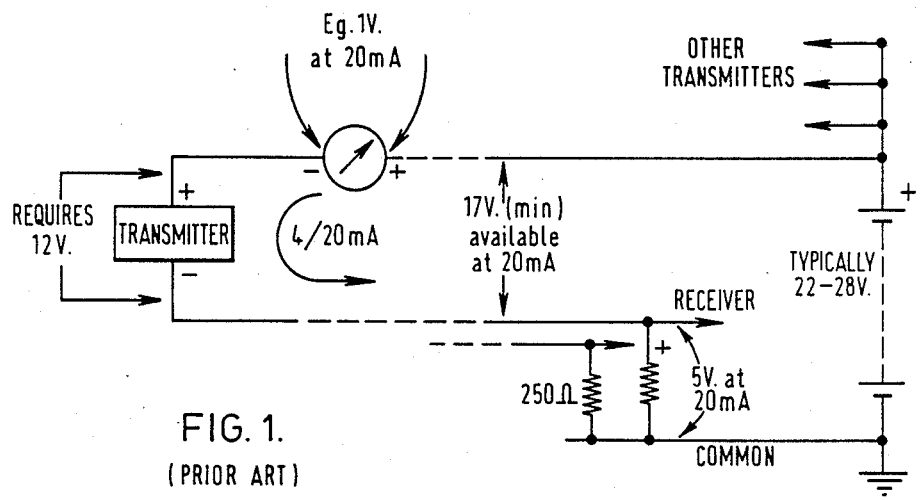
FIGS. 1 to 4 illustrate a number of prior art safety barriers, as described above.
Figure 2:
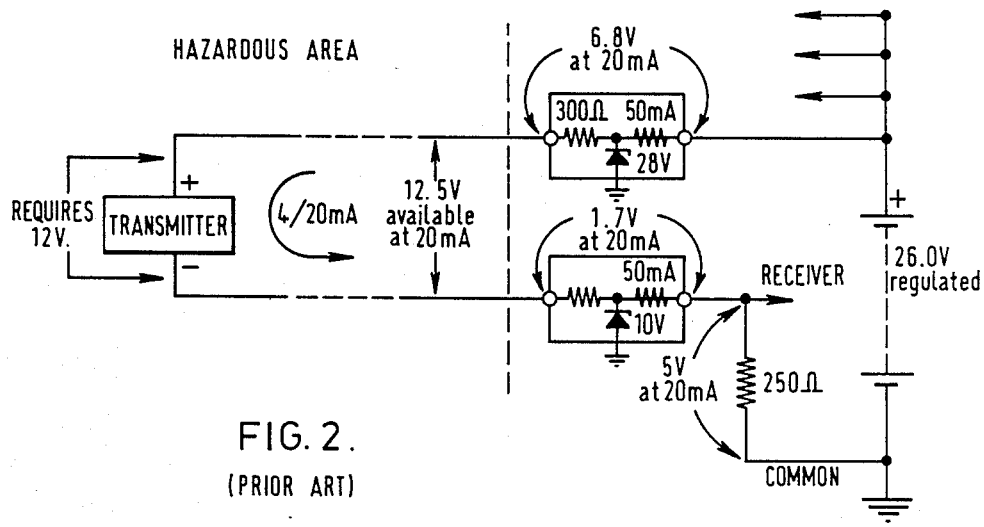
Figure 3:
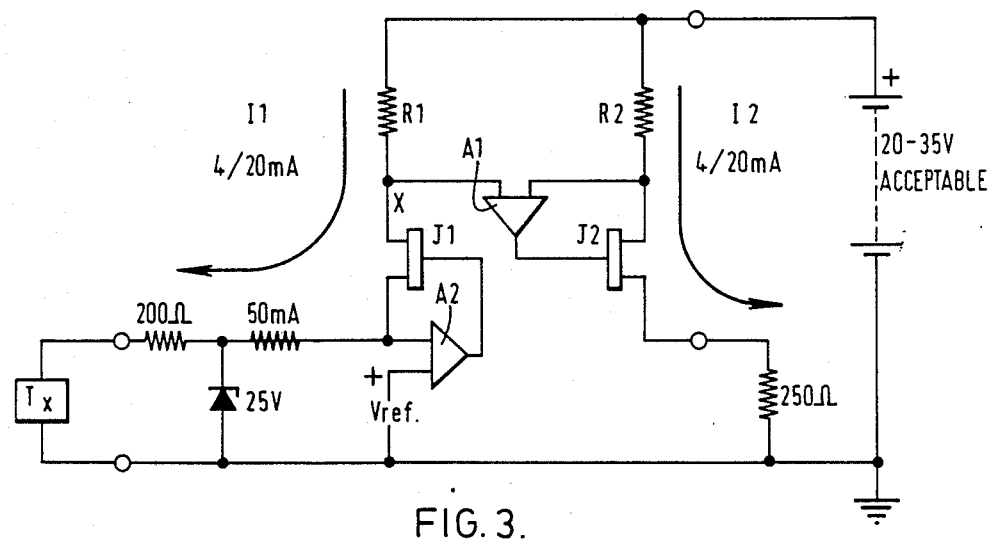
Figure 4:
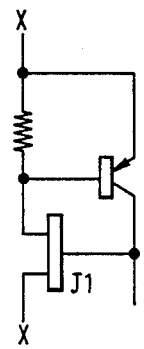
Figure 5:
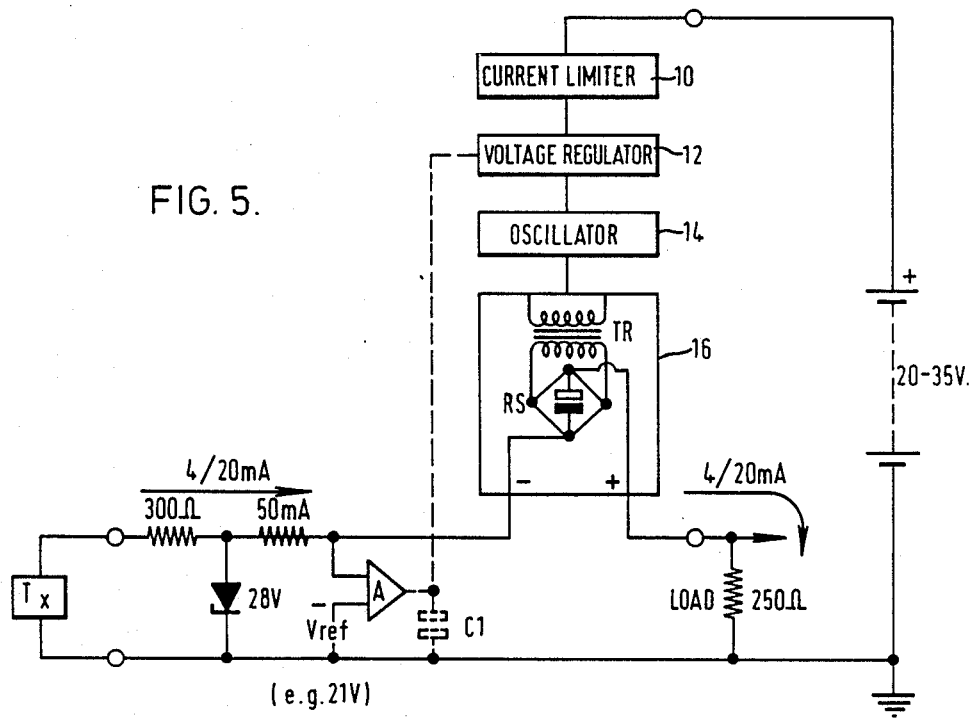
FIG. 5 shows a first embodiment of safety barrier in accordance with the invention, using a transformer coupled floating power supply.

FIG. 5 shows a barrier in which a floating power supply co-operates with a negatively-polarised barrier, to drive the load directly with the current flowing from the transmitter.

The floating supply is derived by conventional means from the common supply (indicated as 20-35V.), these means including for example a current-limiting circuit 10, a voltage regulating circuit 12, a high-frequency oscillator 14, and a unit 16 comprising a small voltage-step-up transformer TR and a rectifying and smoothing circuit RS.

A comparator amplifier A maintains the voltage across the input to the barrier at a level (V ref) somewhat below that at which the Zener diodes in the barrier start to conduct, by controlling the floating supply voltage. In principle this can be done on either side of the isolating transformer TR.

The control loop has the effect of increasing the voltage of the floating supply as the current increases, so as to counteract the increasing voltage drop across the load. In other words, the supply is forced to have a rising voltage/current characteristic. The frequency response of the voltage regulating circuit 12 is restricted by a capacitor C1. This enables the circuit not only to receive digital or frequency signals from a 'smart' transmitter, but also to pass them in the other direction.

Figure 6:
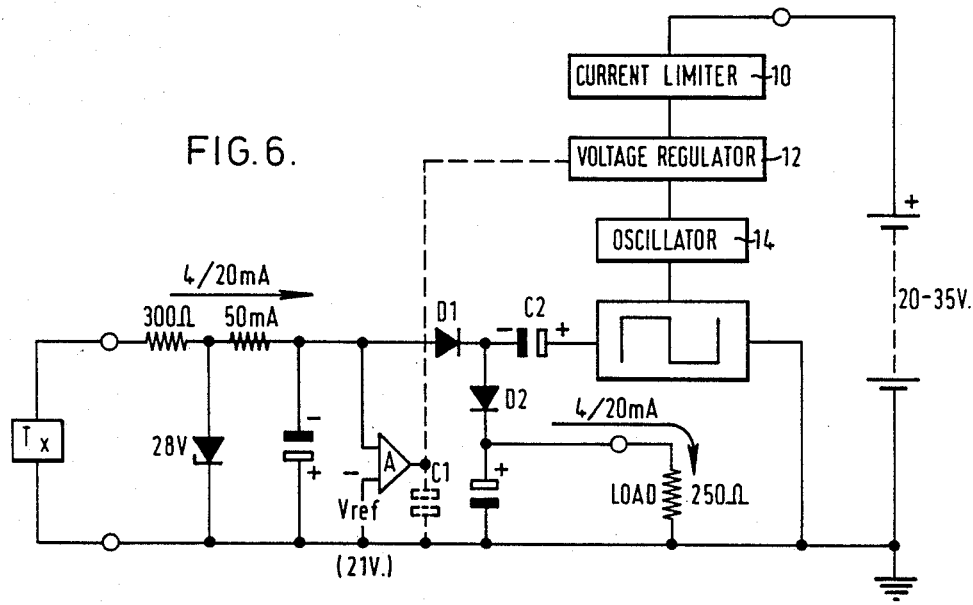
FIG. 6 shows a second embodiment of safety barrier in accordance with the invention, using a diode-pump power supply.
Figure 7:
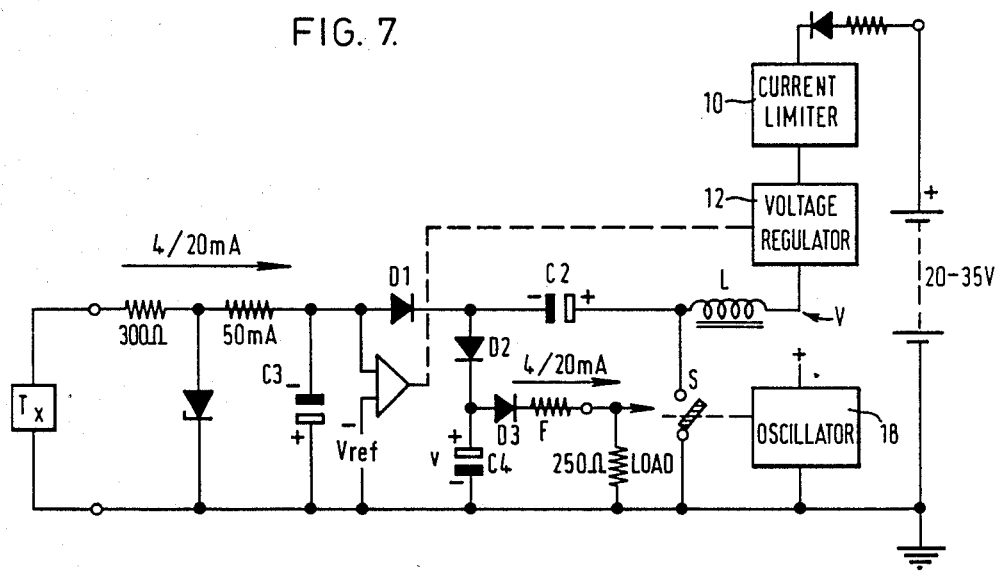
FIG. 7 shows a third embodiment of safety barrier in accordance with the invention.

FIG. 6 shows an equivalent arrangement to that of FIG. 5 in which the transformer TR is replaced by a diode pump circuit. The pump, comprising diodes D1 and D2, capacitor C2 and an oscillator working from the common power supply, operates in similar fashion to a floating supply to drive the load with a current that is precisely equal to that which it draws from the barrier. The only requirement for this equality to be true is that capacitor C2 should not sustain any dc leakage. Leakage through the diodes, diode self-capacitance and oscillator waveform are irrelevant. As before, comparator amplifier A controls the voltage regulator 12 to ensure that the correct voltage is applied to the input of the barrier, whatever the voltage of the supply, or the voltage drop across the load. Since the current drawn from the barrier and fed to the load is pulsed dc, each circuit requires a smoothing (reservoir) capacitor, which must not leak significantly. If necessary this practical problem can be greatly reduced by employing two separate diode pump circuits operating in phase opposition, so that smaller smoothing capacitors are adequate. The peak-to-peak voltage of the oscillator has to exceed the voltage applied to the barrier (eg 21V) plus that delivered to the load (eg 5V) plus the voltage drop across the two pump diodes (eg 1.5V) plus any drop across a reverse-voltage protection diode D3 and fuse F in series with the output as shown in FIG. 7 (say 1V)—total 28.5V. This exceeds the typical minimum voltage of the supply (22V), so some sort of voltage step-up is preferable. This can be achieved for example as shown in FIG. 7.

FIG. 7 shows a diode-pump arrangement in which the necessary voltage boost is provided by an intermittently clamped inductor L. Such inductors are widely used and are readily available in large quantities at low cost. An oscillator 18 drives a transistor switch S with on 'on-time' sufficient to provide the required voltage boost, typically about 25% of a cycle. While switch S is clamped, the current through inductor L increases, and capacitor C2 draws current through diode D1 from the reservoir capacitor C3 of the barrier. When switch S is opened, the junction of inductor L and capacitor C2 flies positive, driving current through diode D2 into the reservoir capacitor C4 supplying the load. Meanwhile, the current through inductor L decreases. The current in the load must equal that drawn through the barrier, provided that there is no dc leakage through capacitor C2 or the two reservoir capacitors C3, C4. The voltage across capacitor C2 automatically adjusts so that this is the case. Since the average voltage across inductor L, ignoring IR drops, must be zero over a cycle (otherwise the flux in the core would continually increase) the supply voltage needed is:

$V = (V \text{ ref} + v + 0.75 + 0.75)(1 - 0.25)$, if D1 and D2 each drop 0.75V and the on-time of switch S is one quarter of a cycle. Hence the supply voltage required in the example is $(21 + 5 + 1 + 1.5)(0.75) = 21.4V$, a little less than the 22V minimum available.

Figure 8:
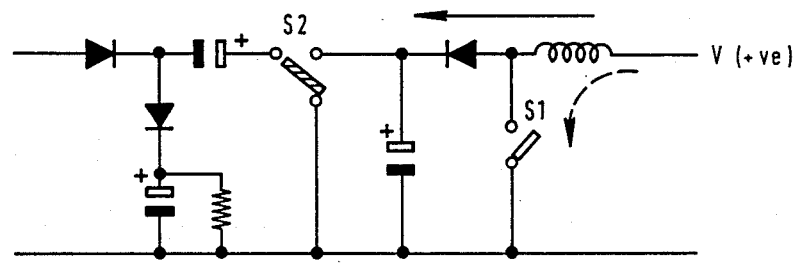
FIG. 8 shows a circuit modification for use with the barrier shown in FIG. 7; and, FIG. 9 shows a fourth embodiment of safety barrier in accordance with the invention.

The degree of voltage boost can be adapted as required by choosing the mark-space ratio of the oscillator 18. The simple circuit described allows a single switch S to combine the functions of defining the degree of boost and providing an ac signal to drive the pump. Other similar circuits are possible, in which these functions may not be combined. In particular, as shown in FIG. 8, two switches S1 and S2 may be used, with the boosted voltage being stored o an earthed, rather than a floating, capacitor, FIG. 8, and with the regulator being a switching regulator.

Figure 9:
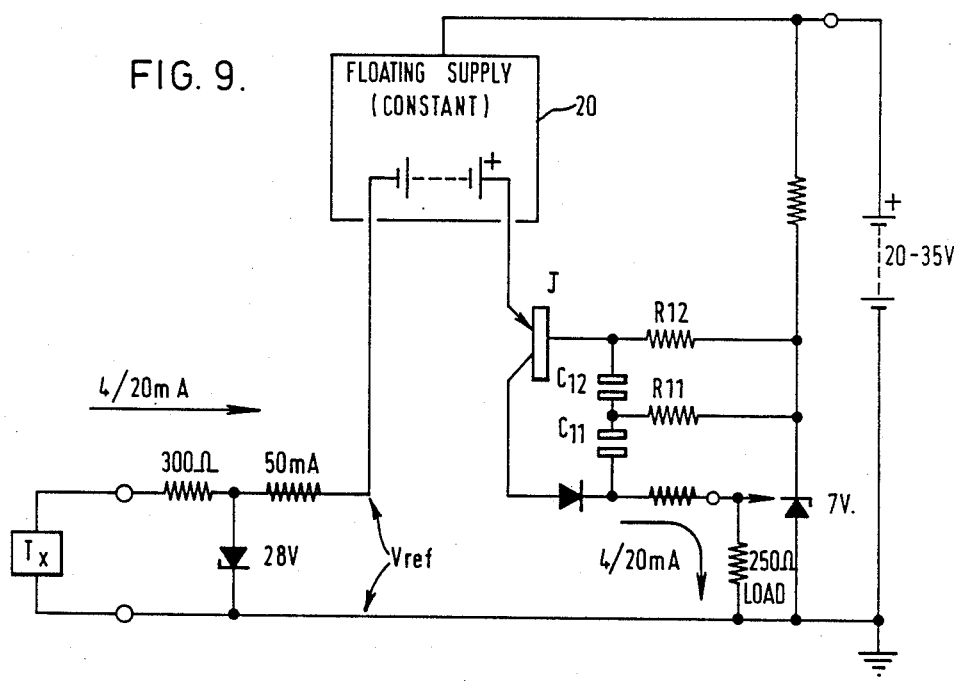

An alternative method of maintaining a suitable constant voltage, Vref, across the barrier is shown in FIG. 9. Although the diagram depicts a floating dc supply 20, the principle applies equally to diode-pump arrangements. The voltage of the supply is held constant by conventional means, and drives the load via a voltage amplifier, J, with virtually unity current gain. In practice J might be two or three transistors connected in cascade. Since the base of J is held at a constant potential, Vref also must be constant. Compensation for variations in the voltage drop across the load is provided automatically by equal and opposite variations in the voltage across amplifier J.

The arrangement has particular advantages for barriers intended to be used with smart transmitters. All shunt-diode barriers normally will receive digital or frequency signals up to at least several kHz. However, floating-supply arrangements as described will not pass them in the opposite direction unless the response of the voltage-compensating circuit, i.e. of amplifier J in FIG. 9, is suitably delayed or otherwise disabled. Unfortunately this slows or otherwise degrades the response of the barrier to variations in the 4 to 20 mA measurement signal. Therefore the problem becomes one of discriminating between two frequencies and finding a suitable compromise. A particular advantage of the type of circuit shown is that the base circuit of amplifier J has a very high impedance, and therefore lends itself to the incorporation of filters or other circuits using small and inexpensive components. Multi-stage filters, as exemplified by C11, R11; C12, R12 in FIG. 9 may be useful if the communication frequency and the desired measurement response frequency are not widely separated.

We claim:

1. A safety barrier for energizing a two-wire transmitter, the barrier including floating DC power supply means adapted to enable the barrier to deliver into a grounded load a direct current substantially equal to that which it draws from the transmitter, in which the floating DC power supply means is derived from an external DC source, with means to generate the floating power supply means being located within the barrier and comprising an oscillator, a voltage step-up transformer, and a rectifying and smoothing circuit.

2. A safety barrier according to claim 1, in which said means to generate the floating power supply within the barrier comprises an oscillator and at least one diode-pump circuit driven by the oscillator, the at least one diode-pump circuit driving the load with a current equal to that which it draws from the barrier.

3. A safety barrier according to claim 2, which includes at least one switched inductor associated with said at least one diode-pump circuit to boost the peak-to-peak voltage of said oscillator.

4. A safety barrier according to claim 3, in which said at least one inductor is controlled by switch means, with the on-time of said switch means providing the desired voltage boost.

5. A safety barrier according to claim 4, in which the on-time is one quarter of a cycle.

6. A safety barrier according to claim 3, in which said at least one switched inductor directly provides an ac drive for the at least one diode-pump circuit.

7. A safety barrier for energizing a two-wire transmitter, the barrier incorporating floating DC power supply means adapted to enable the barrier to deliver into a grounded load a direct currently substantially equal to that which it draws from the transmitter, and including means for maintaining a constant voltage across the barrier, said means including a voltage compensating circuit having voltage regulator means that does not modify the transmitter current connected between the floating DC power supply means and the load.

8. A safety barrier for energizing a two-wire transmitter, the barrier including floating DC power supply means to enable the barrier to deliver into a grounded load a direct current substantially equal to that which it draws from the transmitter, in which compensation for variations in the voltage across the load is delayed in time so that the barrier will pass superimposed digital or frequency signals in both directions.

9. A single-channel shunt-diode safety barrier for energizing a two-wire transmitter, comprising a floating DC power supply means for delivering into a grounded load a direct current substantially equal to that which it draws from the transmitter, the floating DC power supply means being located within the barrier and including oscillator means and at lest one diode-pump circuit means driven by the oscillator means for driving the load with a current equal to that which it draws from the barrier.

10. A safety barrier according to claim 9, which includes at least one switched inductor means associated with said at least one diode-pump circuit means to boost the peak-to-peak voltage of said oscillator means.

11. A safety barrier according to claim 10, in which said at least one switched inductor means directly provides an AC drive for the at least one diode-pump circuit means.

12. A safety barrier according to claim 10, in which said at least one inductor means is controlled by switch means producing a periodic on-time of said switch means with the on-time providing the desired voltage boost.

13. A safety barrier according to claim 12, ion which the on-time is one-quarter of a cycle.

14. A safety barrier for energizing a two-wire transmitter, the barrier incorporating floating DC power supply means for enabling the barrier to deliver into a grounded load a direct current substantially equal to that which it draws from the transmitter, including a voltage-compensating circuit means comprising voltage regulator means that does not modify the transmitter current connected between the floating DC power supply and the load for maintaining a constant voltage across the barrier.

15. A safety barrier for energizing a two-wire transmitter, the barrier incorporating floating DC power supply means for enabling the barrier to deliver into a grounded load a direct current substantially equal to that which it draws from the transmitter, in which the barrier is polarized to pass signals of negative polarity with respect to ground and the current delivered to the load is positive with respect to ground.

16. A safety barrier for energizing a two-wire transmitter, the barrier incorporating floating DC power supply means for enabling the barrier to deliver into a grounded load a direct current substantially equal to that which it draws from the transmitter, including at least one regulating circuit means for holding the voltage applied to the barrier automatically at a level below the level at which the barrier starts to conduct and for compensating the variations in the supply voltage and the voltage drop across the load, and in which compensation for variations in the voltage across the load is delayed in time so that the barrier will pass superimposed digital or frequency signals in both directions.

17. A safety barrier according to claim 16 in which the at lest one regulating circuit means comprises a switching regulator.

* * * * *